Dec. 27, 1927.
1,654,356
V. WEINBERGER ET AL
HOT CHOCOLATE AND MILK MIXER AND SERVER
Filed Feb. 7, 1927
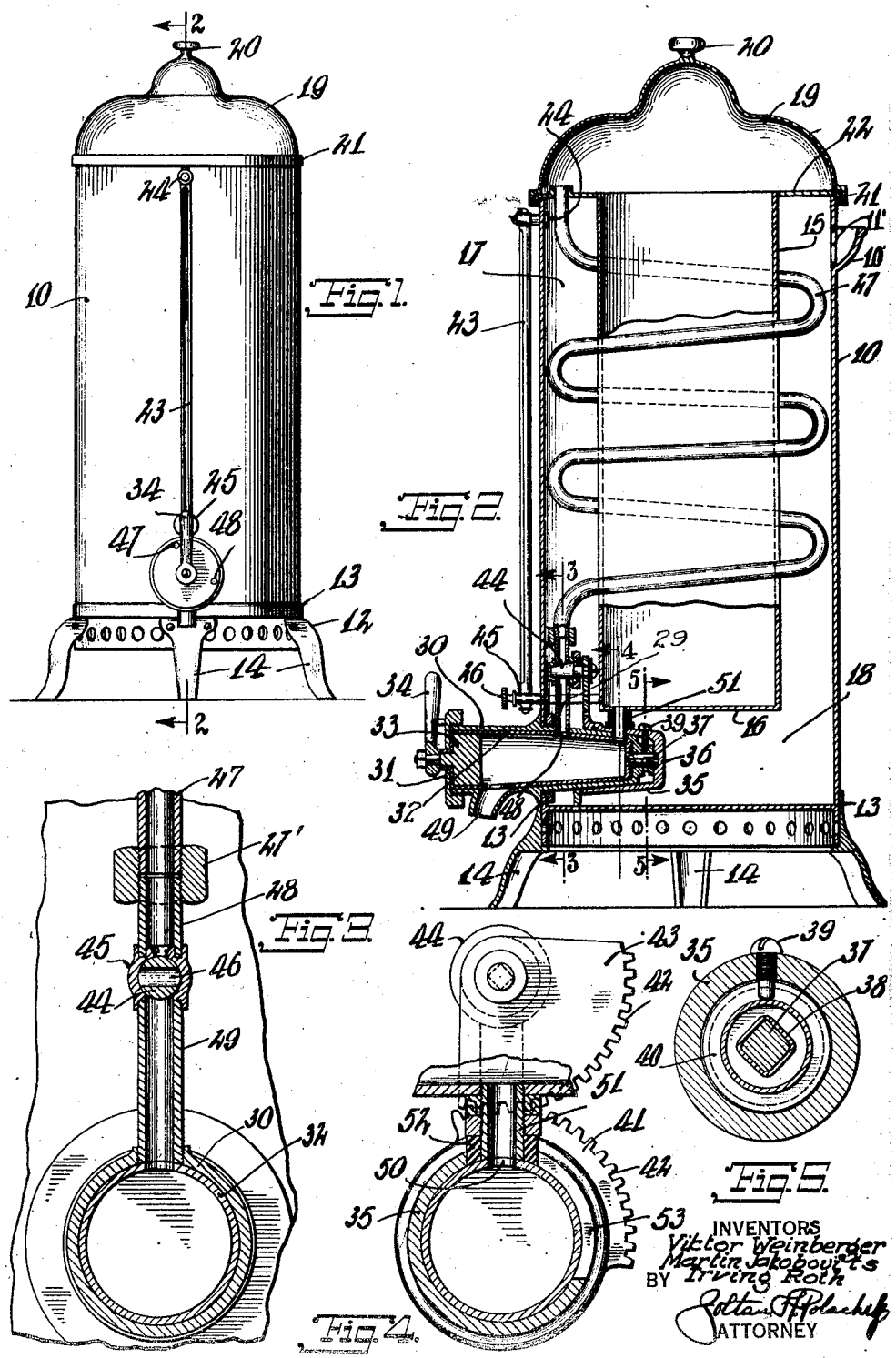

Patented Dec. 27, 1927.

1,654,356

UNITED STATES PATENT OFFICE.

VIKTOR WEINBERGER, MARTIN JAKOBOVITS, AND IRVING ROTH, OF NEW YORK, N. Y.

HOT CHOCOLATE AND MILK MIXER AND SERVER.

Application filed February 7, 1927. Serial No. 166,455.

This invention relates to a new and useful device in the nature of a hot chocolate and milk mixer and server, adapted for use in restaurants, soda fountains, lunch rooms, and the like for the purpose of serving hot chocolate and milk mixed in the required proportions as required to provide delicious, appetizing drinks of uniform consistency.

The object of the invention is to provide a hot chocolate and milk mixer and server of novel construction and arrangement of parts, hereinafter more fully described, claimed and illustrated in the accompanying drawing.

Fig. 1 is a front elevational view of our improved device.

Fig. 2 is a vertical sectional view thereof, taken on the line 2—2 of Figure 1.

Fig. 3 is an enlarged vertical sectional view, taken on the line 3—3 of Figure 2.

Fig. 4 is a similar sectional view taken on the line 4—4 of Figure 2.

Fig. 5 is a similar sectional view taken on the line 5—5 of Figure 2.

As here embodied our improved device comprises a hollow cylindrical member 10 or shell, having a base 11, and open at its upper extremity. The supporting member 12 is of ring shaped construction, and is provided with a flanged portion 13, adapted to receive the lower portion of the shell 10. The supporting member 12, is provided with downwardly extended elements 14, or legs, adapted to support the shell 10, in a vertical position, on a counter, stand, table, or the like.

The hollow cylindrical member 15, or inner shell, is provided with a base 16, or bottom, and is of suitable size or dimensions, so as to engage in the above mentioned shell 10, and provide spaces 17 and 18, at the sides and bottom thereof, respectively, adapted to be filled with water. The shell 10, is provided with an extended portion 10' adjacent to the aperture 11' formed in the shell 10, so as to permit the shell 10 to be filled with water.

The cover 19, preferably of bell shaped contour, is provided with a knob 20, or handle, and is provided with an offset flanged lower element 21, adapted to engage the upper open extremity of the shell 10. The cover 19, has attached thereto, adjacent to its lower extremity, an inwardly extended ring shaped member 22, adapted to enclose or cover the space 17, between the sides of the shell 10 and the inner shell 15. A gauge glass 23, is attached at its upper extremity of the tubular member 24, attached to, and intercommunicative with the inner portion of the shell 10. The tubular member 25, is attached to the lower extremity of the gauge glass 23, and is attached to, and intercommunicative with the lower portion of the shell 10. The latter described construction is such as will permit the gauge glass 23, to show the amount of water contained in the shell 10. The tubular member 25 is provided with a valve, such as usually employed in devices of this nature, not shown in the accompanying drawing, controlled by the knob 26, as a means of preventing the milk in the inner shell 15 from entering the gauge glass 23, in event the said gauge glass should be broken or otherwise incapacitated.

The tubular member 27 is positioned in the above mentioned space 17, and is formed, wound, or shaped, in coils, as clearly shown in Figure 2, and extends from the upper open extremity of the shell 10 downwardly therefrom, and is connected at its lower extremity, as at 27', by a common union, to the tubular members 28 and 29, to the faucet housing 30.

The faucet housing 30 is attached, intermediately, at or near the lower extremity of the shell 10 and extends outwardly therefrom. The cap 31, is removably attached to the extended extremity of the faucet housing 30, and is provided with an axial aperture, adapted to receive a tubular extension of the faucet member 32. The faucet member 32 is rotatively mounted in the faucet housing 30, and the extremity of an enclosing member 33, attached to the faucet member 32, is disposed through the tubular extension of the faucet member 32 and through the said cap 31. The handle 34 is attached to the extended extremity of the enclosing member 33, as a means of rotating the said faucet member 32.

The hollow conical member 35, is provided with a closed end 36, and is rotatively mounted on the faucet housing 30 and is provided with an axially inwardly extended portion 37, of square shaped cross section adapted to engage a similar shaped recess 38 formed in the faucet member 32. The threaded member 39, a set screw, or the like, is threadedly attached to the hollow conical member 35, and is adapted to engage in an annular recess 40 formed in the faucet housing 30, as a means of holding or securing the said hollow cylindrical member 35, in place. The hollow cylindrical member 35, is provided with a sector element 41, provided with teeth 42, adapted to engage the similar teeth 42, of the sector 43, attached to the valve 44. The valve 44 is rotatively mounted in the valve housing 45, attached to the above mentioned tubular members 28 and 29. The valve 44 is provided with an aperture 46, coaxial thereto. The above described construction is such as will permit the handle 34, when rotated, or turned, between the limiting pins 47 and 48 attached to and extended from the cap 31 to close the valve 44, and to permit the aperture 48' to register with the tubular member 29, so as to permit the chocolate contained in the tubular member 29 to flow through the outlet 49 of the faucet housing 30, into a cup, glass, container, or the like, not shown in the accompanying drawing, held under the said outlet 49. The above described construction is such as will permit the aperture 50, in the faucet member 32, to be rotated into registration with the tubular member 51, attached to the base 16 and secured in contact with the faucet member 32 by means of a washer 52. When the aperture 50 is in registration with the tubular member 51, milk which may be contained in the inner shell 15 is permitted to flow into the faucet member 32 and to be discharged therefrom through the outlet 49 into a cup or container, not shown in the drawing. The hollow cylindrical member is provided with an elongated slot 53, to permit the said hollow conical member 35 to be rotated, as is required.

It should be understood that the tubular member 27 is adapted to retain a solution of chocolate in close proximity to the container 15 which is filled with milk. The valve 44 is adapted to interrupt the downward flow of chocolate solution for regulating the quantity of solution discharged from the tubular member. The valve 44 is operatively connected with the conical member 35 which is adapted to rotate in unison with the handle 34. When the handle 34 and the faucet member 32 connected therewith are rotated to a position such that the aperture 48' in the faucet member 32 and the aperture 50 in said member are out of registration with the tubular members 29 and 51 respectively, neither the chocolate from the tube 27 nor the milk from the container 15 can flow into the faucet member 32. It should be understood that when the parts are positioned as above described, the valve 44 in the tubular member is open and the lower tubular section 29 is filled with chocolate and when the handle 34 is rotated to bring the above mentioned apertures into registration with the end of the tubular members as shown in Fig. 2, the valve 44 is moved to closed position and only that amount of chocolate solution contained in the tubular section 29 is permitted to flow into the faucet member 32. As the chocolate solution flows into the faucet member 32 it is washed therefrom by the flow of milk from the container 15. Thus, it should be understood that a predetermined amount of chocolate solution is discharged each time the handle 34 is manipulated and that any desired amount of milk may be permitted to flow through the faucet member 32 thereafter. When the handle 34 is rotated to starting position the apertures 48' and 50 are moved out of registration with the tubes 29 and 51 and the valve 44 is reopened to recharge the tubular section 29 with chocolate solution.

An electric heater or gas burner, such as generally used to heat water is placed under our improved device, as a means of heating the water placed in the above mentioned spaces 17 and 18, which will heat the chocolate and milk, so as to provide hot chocolate drinks.

Having thus described our invention, what we claim as new and desire to protect by Letters Patent of the United States is as follows:

1. A device of the class described, comprising an outer casing, a container disposed in said casing, a tubular member disposed in said casing around said container, a valve housing mounted in an aperture in said casing and communicatively connected with said tubular member and with said container, a valve member rotatively mounted in said valve housing having a mixing chamber therein, a valve disposed in said tubular member intermediate the ends thereof, and driving mechanism operatively connected with said valve member and with the valve of said tubular member adapted to close said last mentioned valve when said valve member is positioned to permit liquids from said container and from the lower portion of said tubular member to flow into said mixing chamber.

2. A device of the class described comprising an outer casing, a container adapted to retain milk mounted in said casing, a tubular member mounted in said casing adapted to retain a chocolate solution, a faucet housing mounted in said casing, a faucet body having a mixing chamber therein intercommunicative with said container and tubular member rotatively mounted in said faucet housing, and a valve disposed in said tubular member above the lower end thereof and operatively connected with said faucet body adapted to be moved to closed position when said faucet body is moved to open position for permitting only that chocolate solution retained in the end portion of said tubular member below the valve to flow into said mixing chamber.

3. A device of the class described, comprising a faucet housing, a faucet body having a mixing chamber therein rotatively mounted in said faucet body, a container adapted to retain milk communicatively connected with said faucet housing adapted to supply milk to said mixing chamber when said faucet body is in a predetermined position, a tubular member communicatively connected with said faucet housing adapted to retain chocolate solution therein and to discharge said solution into said mixing chamber when said faucet body is in the same predetermined position, and a valve in said tubular member operatively connected with said faucet member for predetermining the amount of chocolate solution discharged into said mixing chamber.

In testimony whereof we have affixed our signatures.

VIKTOR WEINBERGER.
MARTIN JAKOBOVITS.
IRVING ROTH.